United States Patent
Wang et al.

(10) Patent No.: US 9,952,474 B2
(45) Date of Patent: Apr. 24, 2018

(54) DESKEW DISPLAY PANEL COMPRISING A PLURALITY OF SCANNING LINES TAKING A PERIODIC LADDER SHAPE

(71) Applicant: SHENZHEN CHINA STAR OPTOELECTRONICS TECHNOLOGY CO., LTD., Shenzhen, Guangdong (CN)

(72) Inventors: Cong Wang, Guangdong (CN); Peng Du, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/777,257

(22) PCT Filed: Jun. 2, 2015

(86) PCT No.: PCT/CN2015/080606
§ 371 (c)(1),
(2) Date: Oct. 1, 2015

(87) PCT Pub. No.: WO2016/033997
PCT Pub. Date: Mar. 10, 2016

(65) Prior Publication Data
US 2017/0184933 A1    Jun. 29, 2017

(30) Foreign Application Priority Data
Sep. 5, 2014 (CN) .......................... 2014 1 0451821

(51) Int. Cl.
*G02F 1/1362* (2006.01)
*G09G 3/36* (2006.01)

(52) U.S. Cl.
CPC .. *G02F 1/136213* (2013.01); *G02F 1/136286* (2013.01); *G09G 3/3648* (2013.01); *G09G 2300/0426* (2013.01)

(58) Field of Classification Search
None
See application file for complete search history.

(56) References Cited

U.S. PATENT DOCUMENTS

2005/0001807 A1*  1/2005  Lee .................. G02F 1/134363
                                                      345/92
2005/0168678 A1*  8/2005  Andou ............. G02F 1/133514
                                                      349/145

(Continued)

FOREIGN PATENT DOCUMENTS

CN        1670909 A       9/2005
CN     101661941 A       3/2010

(Continued)

OTHER PUBLICATIONS

Yuanfeng Fang, The International Searching Authority written comments, Aug. 2015, CN.

*Primary Examiner* — Paul Lee

(57) ABSTRACT

A deskew display panel is disclosed in present invention. The deskew display panel includes a plurality of data lines arranged in a column direction, a plurality of scanning lines perpendicular to the column direction and intersecting the data lines; a sub-pixel array including a plurality of sub-pixels arranged in array, each sub-pixel including a transistor and disposed between any two neighboring scanning lines and any two neighboring data lines; the scanning lines disposed in the sub-pixel array and parallel to each other; sub-pixels in each row including a plurality of sub-pixel sets, each sub-pixel set including two sub-pixels, the sub-pixel including the transistor, gates of the transistors connected to two neighboring scanning lines respectively, sources of the (Continued)

transistors connected to the same data line, and drains of the transistors connected to a liquid crystal capacitor and a storage capacitor.

4 Claims, 4 Drawing Sheets

(56) References Cited

U.S. PATENT DOCUMENTS

| | | | | |
|---|---|---|---|---|
| 2005/0231447 A1* | 10/2005 | Hu | ............... | G02F 1/134309 345/76 |
| 2011/0115691 A1* | 5/2011 | Liu | ............... | G02F 1/136286 345/55 |
| 2012/0105494 A1* | 5/2012 | Lee | ............... | G09G 3/3614 345/690 |
| 2012/0218322 A1* | 8/2012 | Shiomi | ............ | G02F 1/136286 345/690 |
| 2013/0093734 A1* | 4/2013 | Wang | ............ | G09G 3/3648 345/204 |

FOREIGN PATENT DOCUMENTS

| | | | |
|---|---|---|---|
| CN | 102290026 | A | 12/2011 |
| CN | 102332245 | A | 1/2012 |
| CN | CN103293809 | A | 9/2013 |
| CN | 104238217 | A | 12/2014 |
| KR | 20040089141 | A | 10/2004 |
| KR | 20130067923 | A | 6/2013 |
| WO | WO9812689 | A1 | 3/1998 |

* cited by examiner

DESKEW DISPLAY PANEL COMPRISING A PLURALITY OF SCANNING LINES TAKING A PERIODIC LADDER SHAPE

FIELD OF THE INVENTION

The present invention relates to the field of liquid crystal display panel, and more particularly, relates to a deskew display panel.

BACKGROUND OF THE INVENTION

In traditional trigate liquid crystal display panel, the high pin count is provided for the IC of the source of the transistor for reducing the cost. However, only one IC and one group of fanout provided in the source would cause a great difference in the resistances of the fanouts. In practice, if the difference of the resistances is too large, a phenomenon of color cast would occur on the periphery area of the display panel while the image with mixing colors is displayed. For example, when the display panel displays the image with mixing colors, the data line charges two sub-pixels, and then charges the next two sub-pixels. If the resistance of fanout is too large, RC delay would be serious. Thus, the second sub-pixel can be charged well than the first sub-pixel while charging. Especially in the periphery area of the display panel, the resistance of the fanout reaches its maximum point; and the RC delay is relatively serious, which cause a phenomenon of colorcast.

FIG. 1A shows a conventional layout of the traditional trigate liquid crystal display panel with a source provided with high pin count, while the display panel displays the image with blue and redmixing colors (at the time, the green sub-pixel have not been charged). The scanning lines scan from top to bottom. The difference between the resistances of the fanouts in the central area and in the periphery area of the display panel is large, the extents of RC delay in the data line are different from each other, and the RC delay would be more serious in the periphery area of the display panel. When the red sub-pixel and blue sub-pixel work, the blue sub-pixel can be charged firstly, and then the red sub-pixel is charged. Referring to FIG. 1B through FIG. 1D, since the RC delay in the periphery area of the display panel is serious, the blue sub-pixels in the periphery area of the display panel may be charged lower than the red sub-pixels. Thus, when a purple image is displayed on the periphery area of the display panel, the purple image may present red color cast. If the scanning lines scan in an opposite direction, the purple image may present blue color. Such phenomenon of color cast also occurs on the display panel while displaying yellow image, blue image and so on.

FIG. 2 shows a layout of the conventional trigate liquid crystal display panel. The reference number D1 to D5 denote data lines. The reference number G1 to G10 denote scanning lines. The numbers in circle denote the serial numbers of fanout circuits. In the traditional layout, the data line can charge the sub-pixels in an order as follows: R→G→B→R→G→B.

FIG. 3 is a schematic view illustrating waveforms for driving some of scanning lines of the conventional trigate liquid crystal display panel. Vgh denotes high level. When the scanning line is fed the high level Vgh, the transistor connected with the scanning line turns on, and corresponding pixels can be charged. Vgl denotes low level. When the scanning line is fed the low level, such transistor turns off. The signal from fanout circuit drives the scanning lines to work in an order: 1, 2, 3, . . . , 2n−1, 2n, thus can cause a color castoccurredon the periphery area of the display panel.

SUMMARY OF THE INVENTION

Aiming at the drawbacks that colorcast occurson the display panel during the color mixing process in the prior art, the object of the present invention is to provide a deskew display panel to solve the problem above-mentioned.

The technical solutions of the present disclosure for solving problem above-mentioned as follows:

A deskew display panel comprises,
a plurality of data lines arranged in a column direction,
a plurality of scanning lines perpendicular to the column direction and intersecting the data lines;
a sub-pixel array including a plurality of sub-pixels arranged in array, each sub-pixel disposed between any two neighboring scanning lines and any two neighboring data lines;
the scanning lines disposed in the sub-pixel array and parallel to each other;
sub-pixels in each row including a plurality of sub-pixel sets, each sub-pixel set including two sub-pixels, each sub-pixel including a transistor, gates of the transistors connected to two neighboring scanning lines respectively, sources of the transistors connected to the same data line, and drains of the transistors connected to a liquid crystal capacitor and a storage capacitor, and the liquid crystal capacitor and the storage capacitor further connected to a common line;
each scanning line taking a periodic ladder shape and disposed between any two neighboring sub-pixels in each column; in one cycle, the Nth scanning line extends in a row direction and bypassing the Mth sub-pixel in the Nth row, the (M+1)th sub-pixel in the (N+1)th row, the (M+2)th sub-pixel in the (N+1) row and the (M+3)th sub-pixel in the (N+1)th row, in orderly; the scanning lines in the cycle connected to each other, wherein, the N and M are natural number.

Preferably, each scanning line takes a square waveform shape, extends in a row direction and bypassing the sub-pixels in each row.

Preferably, each scanning line comprises a rise portion and a fall portion, the rise portions of the scanning lines aligned with each other, and the fall portions of the scanning lines aligned with each other.

Preferably, the sub-pixels in each row display red color, green color or blue color, and every three consecutive rows display different colors.

A deskew display panel comprises,
a plurality of data lines arranged in a column direction,
a plurality of scanning lines perpendicular to the column direction and intersecting the data lines;
a sub-pixel array including a plurality of sub-pixels arranged in array, each sub-pixel disposed between any two neighboring scanning lines and any two neighboring data lines;
the scanning lines disposed in the sub-pixel array and parallel to each other;
sub-pixels in each row including a plurality of sub-pixel sets, each sub-pixel set including two sub-pixels, each sub-pixel including a transistor, gates of the transistors connected to two neighboring scanning lines respectively, sources of the transistors connected to the same data line, and drains of the transistors connected to a liquid crystal capacitor and a storage capacitor, and the liquid crystal capacitor and the storage capacitor further connected to a common line;

each scanning line taking a square waveform shape, extending in a row direction and around the sub-pixels in each row;

each scanning line comprising a rise portion and a fall portion, the rise portions of the scanning lines aligned with each other, and the fall portions of the scanning lines aligned with each other.

Preferably, each scanning line takes a periodic ladder form, and disposed between any two neighboring rows of sub-pixels.

Preferably, in one cycle, the Nth scanning line bypass the Mth sub-pixel in the Nth row, the (M+1)th sub-pixel in the (N+1)th row, the (M+2)th sub-pixel in the (N+1) row and the (M+3)th sub-pixel in the (N+1)throw, in orderly; the scanning lines in the cycle are connected to each other; wherein, the N and M represent natural number.

Preferably, the sub-pixels in each row display red color, green color or blue color, and every three consecutive rows display different colors.

A deskew display panel comprises, a plurality of data lines arranged in a column direction, a plurality of scanning lines perpendicular to the column direction and intersecting the data lines;

a sub-pixel array including a plurality of sub-pixels arranged in array, each sub-pixel disposed between any two neighboring scanning lines and any two neighboring data lines;

the scanning lines disposed in the sub-pixel array and parallel to each other;

sub-pixels in each row including a plurality of sub-pixel sets, each sub-pixel set including two sub-pixels, each sub-pixel including a transistor, gates of the transistors connected to two neighboring scanning lines respectively, sources of the transistors connected to the same data line, and drains of the transistors connected to a liquid crystal capacitor and a storage capacitor, and the liquid crystal capacitor and the storage capacitor further connected to a common line.

Preferably, each scanning line takes a square waveform shape, extends in a row direction and around the sub-pixels in each row.

Preferably, each scanning line comprises a rise portion and a fall portion, the rise portions of the scanning lines aligned with each other, and the fall portions of the scanning lines aligned with each other.

Preferably, the scanning line takes a periodic ladder shape and disposed between any two neighboring rows of the sub-pixels.

Preferably, in one cycle, the Nth scanning line bypasses the Mth sub-pixel in the Nth row, the (M+1)th sub-pixel in the (N+1)th row, the (M+2)th sub-pixel in the (N+1) row and the (M+3)th sub-pixel in the (N+1)th row ,in orderly; the scanning lines in the cycle are connected to each other, wherein, the N and M represent natural number.

Preferably, the sub-pixels in each row display red color, green color or blue color, and every three consecutive rows display different colors.

When implementing the deskew display panel of the present invention, the following advantageous effects can be achieved: when the deskew display panel displays normally, one data line can charge two sub-pixels that display same colors simultaneously so that the ratio of the quantity of the sub-pixels with color cast to the quantity of the whole color-mixing sub-pixels is reduced, and thus the extent of color cast can be effectively suppressed, especially for the periphery area of the display panel, where the RC delay is serious.

DETAILED DESCRIPTION OF THE PREFERRED EMBODIMENTS

The present disclosure will now be described in detail with reference to the accompanying drawings and embodiments.

A deskew display panel according to a first embodiment of the present disclosure comprises a sub-pixel array, a plurality of data lines and a plurality of scanning lines. The sub-pixel array includes a plurality of sub-pixels arranged in an array. Each sub-pixel includes one transistor. The transistor may be thin film transistor. The data lines are arranged in a column direction. The scanning lines intersect the data lines. The scanning lines are arranged in a row direction, parallel to each other and disposed between the sub-pixels of the sub-pixel array. With the configuration of the layout of the scanning lines and data lines, each sub-pixel of the sub-pixel array is disposed between any two neighboring scanning lines and any two neighboring data lines.

Specifically, in the sub-pixel array, sub-pixels in each row include a plurality of sub-pixel sets. Each sub-pixel set includes two sub-pixels. The two sub-pixels include two transistors. Gates of the transistors are connected to two neighboring scanning lines respectively, sources of the transistors are connected to the same data line, and drains of the transistors are connected to a liquid crystal capacitor and a storage capacitor. The liquid crystal capacitor and storage capacitor further connected to a common line.

In the sub-pixel array, the sub-pixels in each row display red color, green color or blue color. Every three consecutive rows of sub-pixels display different colors. The number of rows and columns and quantity of sub-pixels of the sub-pixel array are variable according to actual requirements.

Each scanning line takes a square waveform shape, extending in the row direction and around every sub-pixel in each row. Each scanning line includes a rise portion and a fall portion. The rise portions of the scanning lines are aligned with each other. The fall portions of the scanning lines are aligned with other.

Figure 1A:
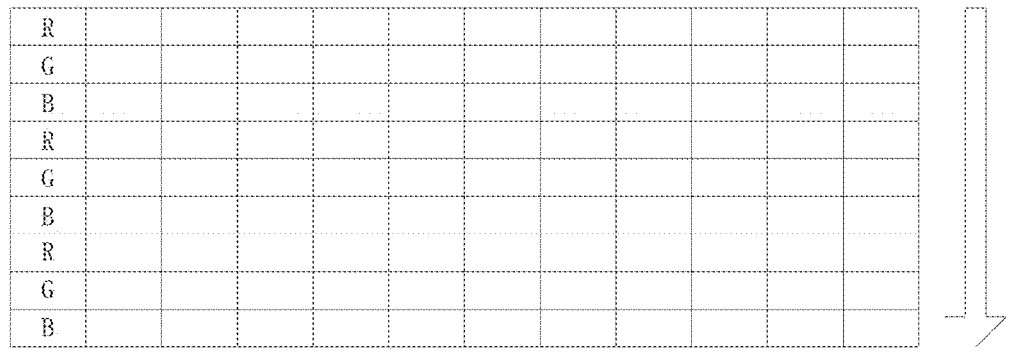
FIG. 1A is an illustrative view showing red and blue color-mixing image displayed on a conventional trigate liquid crystal display panel.
Figure 1B:
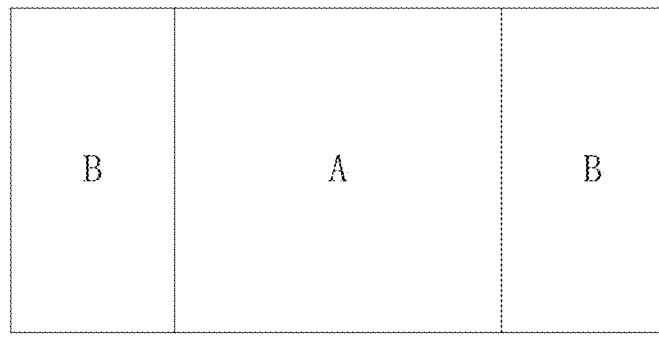
FIG. 1B is an illustrative view showing a central area and a periphery area of the conventional trigate liquid crystal display panel.
Figure 1C:
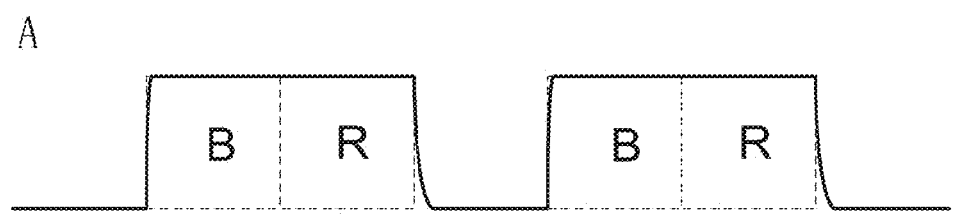
FIG. 1C shows a waveform of data signals in the central area of the conventional trigate liquid crystal display panel.
Figure 1D:
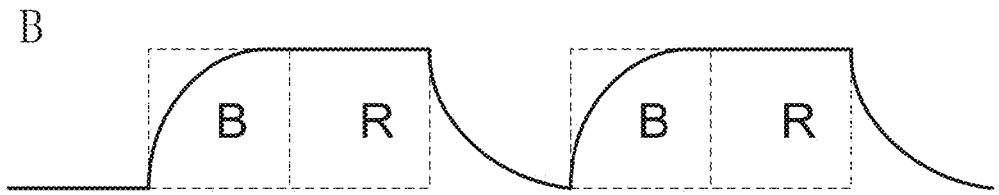
FIG. 1D shows a waveform of data signals in the periphery area of the conventional trigate liquid crystal display panel.
Figure 2:
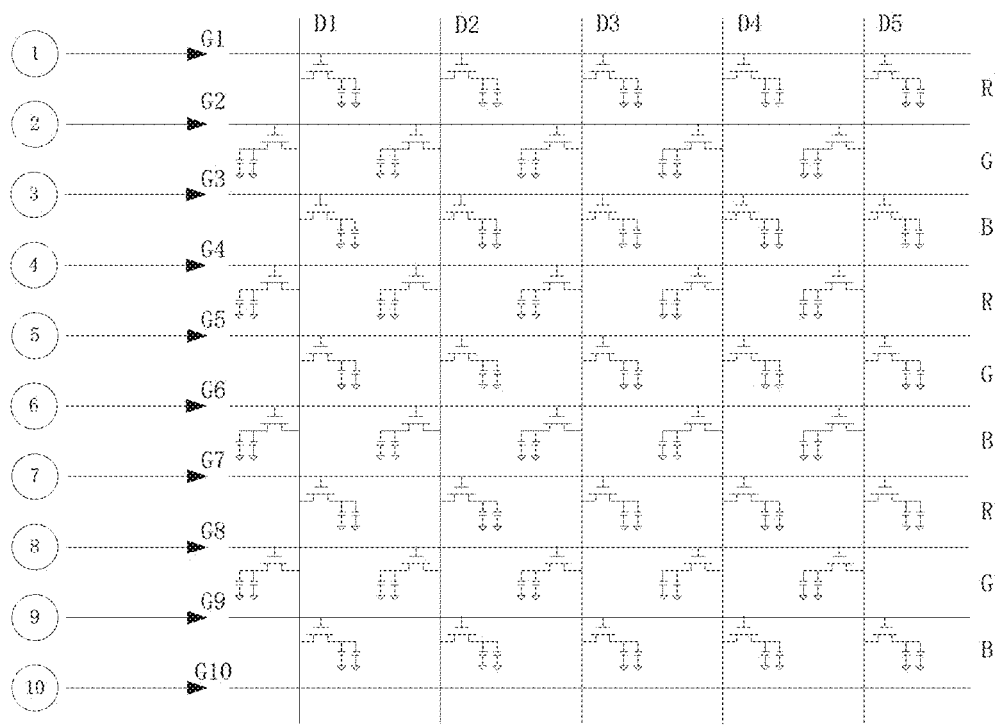
FIG. 2 is a schematic view illustrating a layout of the conventional trigate liquid crystal display panel.
Figure 3:
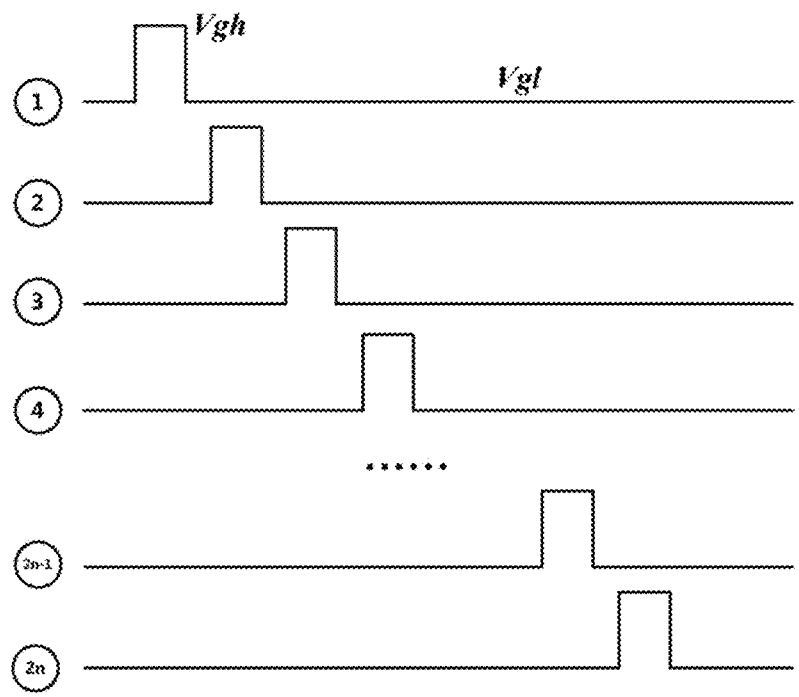
FIG. 3 is a schematic view illustrating waveforms for driving the scanning lines of the conventional trigate liquid crystal display panel.
Figure 4:
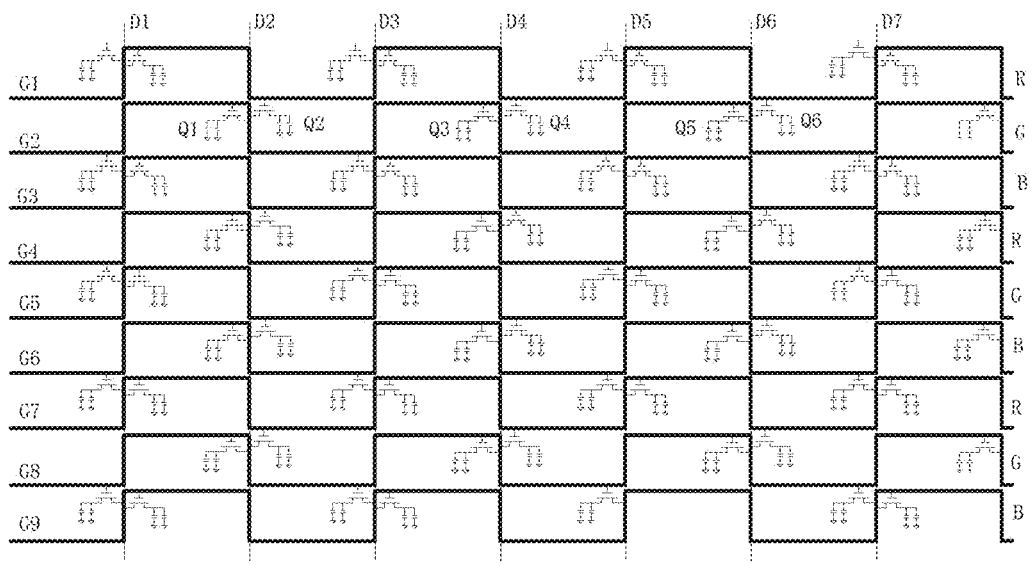
FIG. 4 is a schematic diagram of a layout of a deskew display panel according to a first embodiment of the present disclosure.

The deskew display panel according to the embodiment includes seven data lines D1-D7, nine scanning lines G1-G9 and nine rows and eight columns sub-pixel array. As shown in FIG. 4, the serial number 1, 2, 3, . . . , n−1, n of the lines in fanout corresponds to that in the inner of the panel one by one. The sub-pixels from the first row to the nine row display continuously in order of red (R), green (G), blue (B), R, G, B, R, G, B. It is different from the conventional trigate liquid crystal display panel that each scanning line in the deskew display panel of the embodiment takes a square waveform shape. The Nth scanning line extends in the Nth row and bypasses the sub-pixels in the Nth row in orderly in a data transmitting direction of the scanning line, i.e. in the direction from the left side to the right side of the drawings. The scanning lines are disposed apart from each other. Herein, N is natural number. The shape of the data line is identical to that in the conventional trigate liquid crystal display panel.

For example, the sub-pixels in the second row display green color and include four sub-pixel sets. The first sub-pixel set includes a transistor Q1 and a transistor Q2. The second sub-pixel set includes a transistor Q3 and a transistor Q4. The third sub-pixel set includes a transistor Q5 and a transistor Q6. The second scanning line extends around the sub-pixels that include the transistors Q1, Q2, Q3, Q4, Q5, Q6. Additionally, for example, when the deskew display panel displays normally, the first data line D1 can charge the sub-pixels in an order as follows: R→B→B→G→G→R→R→B→B→G→G, and so on.

Figure 5A:
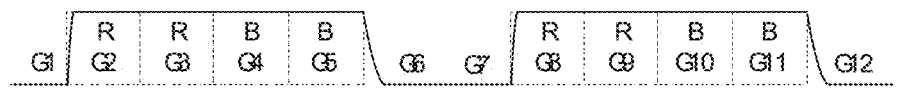
FIG. 5A shows pixel color and driving waveforms of data lines that correspond to scanning lines located in a central area of the deskew display panel according to the first embodiment, while the deskew display panel displays an image with red and blue color-mixing.
Figure 5B:
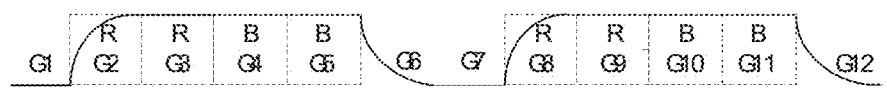
FIG. 5B shows pixel color and driving waveforms of data lines that correspond to scanning lines located in a periphery area of the deskew display panel according to the first embodiment, while the deskew display panel displays image with red and blue color-mixing.

When the deskew display panel displays purple color generated by mixing the red color and blue color, the scanning lines are driven from top to bottom, i.e. the scanning lines scan from top to bottom. FIG. 5A shows pixel color and driving waveforms of data lines that correspond to scanning lines located in a central area of the deskew display panel according to the first embodiment, while the deskew display panel displays an image with red and blue color-mixing. As shown in FIG. 5A, since the RC delay is not serious in the central area of the display panel, the extent of color cast can be effectively suppressed. FIG. 5B shows pixel color and driving waveforms of data lines that correspond to scanning lines located in a periphery area of the deskew display panel according to the first embodiment, while the deskew display panel displays an image with red and blue color-mixing. As shown in FIG. 5B, with the configuration of the layout, one data line can charge four sub-pixels simultaneously. Although the RC delay in the periphery area of the display panel is more serious and the first sub-pixel charged lower than the other three sub-pixels, on the whole, only half red sub-pixels and blue sub-pixels are not charged the same as each other, and another half red sub-pixels and blue sub-pixels are charged identically to each other. Thus, the difference in charging different color sub-pixels is lower and the extent of color cast in periphery area of the display panel can be effectively suppressed.

In the deskew display panel of the first embodiment, when such display panel displays normally, one data line can charge two sub-pixels displaying same color simultaneously so that the ratio of the quantity of the sub-pixels with color cast to the quantity of the whole color-mixing sub-pixels is reduced, and thus the extent of color cast can be effectively suppressed, especially for the periphery area of the display panel, in which the RC delay is serious.

In a second embodiment, the difference between the first and second embodiments is that the scanning line in second embodiment takes a periodic ladder shape and disposed between two neighboring rows of sub-pixels. Specifically, in one cycle, the Nth scanning line extends in the row direction and around the Mth sub-pixel in the Nth row, the (M+1)th sub-pixel in the (N+1)th row, the (M+2)th sub-pixel in the (N+1)th row and the (M+3)th sub-pixel in the (N+1)th row. The scanning lines in the cycle are connected with each other. Herein, N and M are natural number.

Figure 6:
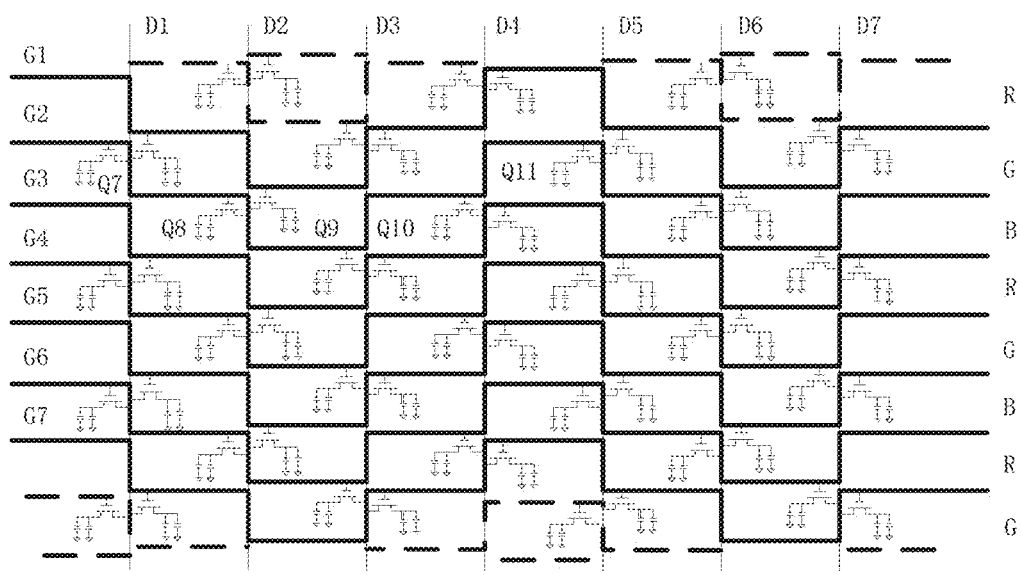
FIG. 6 is a schematic diagram of a layout of a deskew display panel according to a second embodiment of the present disclosure.

The deskew display panel according to the second embodiment includes seven data lines D1-D7, seven scanning lines G1-G7 and eight rows and eight columns sub-pixel array. As shown in FIG. 6, the serial number of the lines in fanout corresponds to that in the inner of the panel one by one. Thus, the serial number is 1, 2, 3, . . . , n−1, n. The sub-pixels from the first row to the nine row display continuously in order of R, G, B, R, G, B, R, G. It is different from the conventional trigate liquid crystal display panel that the scanning line in the deskew display panel of the embodiment takes a periodic ladder shape. The Nth scanning line extends around every sub-pixel in the Nth row and the (N+1)th row.

For example, the second scanning line G2 extends in the row direction and around the sub-pixels in the second row and the third row. Specifically, the second scanning line G2 extends around the first sub-pixel (including a transistor Q7) in the second row, the second sub-pixel (including a transistor Q8) in the third row, the third sub-pixel (including a transistor Q9) in the third row, and the fourth sub-pixel (including a transistor Q10) in the third row. In the next cycle, the scanning line starts to scan from the fifth sub-pixel (including a transistor Q11) in the second row. The scanning lines in the cycle are connected with each other.

The scanning lines scan in a same direction as that in the first embodiment, from G1 to G7 in orderly. The sub-pixels can be charged in an order as follows: G→G→R→R→B→B→. Therefore, in the color-mixing image, one data line can charge four sub-pixels simultaneously. As shown in FIG. 5B, when sub-pixels are charged by the data line, the first red sub-pixel is charged lower, but the two sub-pixels formed color-mixing image are charged saturated. On the whole, the difference in charging different color sub-pixels has been eliminated and the color castoccurred in the periphery area of the display panel can be effectively suppressed.

In the deskew display panel of the second embodiment, when such display panel displays normally, one data line can charge two sub-pixels displaying same color simultaneously so that the ratio of the quantity of the sub-pixels with color cast to the quantity of the whole color-mixing sub-pixels is lower, and thus the extent of color cast can be effectively suppressed, especially for the periphery area of the display panel, where the RC delay is serious.

Those mentioned above are detailed descriptions of the embodiments in the present invention, which cannot define the scope of the present invention, any equivalent or modification known by those ordinary skills in the art can be made to the present invention, which will also fall into the scope of the present invention.

What is claimed is:

1. A deskew display panel, comprising, a plurality of data lines arranged in a column direction;

a plurality of scanning lines perpendicular to the column direction and intersecting the data lines;

a sub-pixel array including a plurality of sub-pixels arranged in array, each sub-pixel disposed between any two neighboring scanning lines and any two neighboring data lines;

the scanning lines disposed in the sub-pixel array and parallel to each other;

sub-pixels in each row including a plurality of sub-pixel sets, each sub-pixel set including two sub-pixels, each sub-pixel including a transistor, gates of the transistors connected to two neighboring scanning lines respectively, sources of the transistors connected to the same data line, and drains of the transistors connected to a liquid crystal capacitor and a storage capacitor, and the liquid crystal capacitor and the storage capacitor further connected to a common line; wherein when the deskew display panel displays normally, one data line charges two sub-pixels that display same colors simultaneously;

each scanning line taking a periodic ladder shape and disposed between any two neighboring sub-pixels in each column; in one cycle, the Nth scanning line extends in a row direction and bypassing, the Mth sub-pixel in the Nth row the (M+1)th sub-pixel in the (N+1)th row, the (M+2)th sub-pixel in the (N+1) row and the M+3th sub-pixel in the (N+1)th row, in orderly; the scanning lines in the cycle connected to each other, wherein, the N and M are natural number.

2. The deskew display panel of claim 1, wherein each scanning line takes a square waveform shape, extends in a row direction and bypassing the sub-pixels in each row.

3. The deskew display panel of claim 2, wherein each scanning line comprises a rise portion and a fall portion, the rise portions of the scanning lines aligned with each other, and the fall portions of the scanning lines aligned with each other.

4. The deskew display panel of claim 1, wherein the sub-pixels in each row display red color, green color or blue color, and every three consecutive rows display different colors.

* * * * *